United States Patent
Ahn et al.

(10) Patent No.: US 10,468,638 B2
(45) Date of Patent: Nov. 5, 2019

(54) METHOD FOR FORMING A POUCH FOR A SECONDARY BATTERY

(71) Applicant: LG CHEM, Ltd., Seoul (KR)

(72) Inventors: Chang Bum Ahn, Daejeon (KR); Hyuk Su Kim, Daejeon (KR); Dae Geun Ku, Daejeon (KR); Hyang Mok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/583,483

(22) Filed: May 1, 2017

(65) Prior Publication Data

US 2017/0237044 A1    Aug. 17, 2017

Related U.S. Application Data

(63) Continuation of application No. 14/224,357, filed on Mar. 25, 2014, now abandoned, which is a
(Continued)

(51) Int. Cl.
*H01M 2/02*        (2006.01)
*H01M 10/05*       (2010.01)
(Continued)

(52) U.S. Cl.
CPC ........... *H01M 2/021* (2013.01); *H01M 2/024* (2013.01); *H01M 2/0237* (2013.01);
(Continued)

(58) Field of Classification Search
CPC ...... H01M 10/0525; H01M 2002/0297; H01M 2/021; H01M 2/0237; H01M 2/0262;
(Continued)

(56) References Cited

U.S. PATENT DOCUMENTS

2002/0160257 A1    10/2002 Lee et al.
2002/0160258 A1    10/2002 Lee et al.
(Continued)

FOREIGN PATENT DOCUMENTS

EP    1102336 A1    5/2001
EP    1416550 A1    5/2004
(Continued)

OTHER PUBLICATIONS

U.S. Appl. No. 14/224,357, filed Mar. 25, 2014, Pouch for Secondary Battery and Secondary Battery Including the Same.
(Continued)

*Primary Examiner* — Scott J. Chmielecki
(74) *Attorney, Agent, or Firm* — Mintz Levin Cohn Ferris Glovsky and Popeo, P.C.; Kongsik Kim; Jhongwoo Jay Peck

(57) ABSTRACT

Provided is a structure of a pouch which may be used in a high-capacity battery having high capacity and high stiffness, wherein the pouch may include an upper housing module which includes a metallic base plate having a concave-shaped accommodation space and polymer layers formed on one surface or both surfaces of the base plate, and a lower pouch sheet which is combined with a lower surface of the upper housing module to seal the accommodation space.

21 Claims, 5 Drawing Sheets

Related U.S. Application Data continuation of application No. PCT/KR2013/010845, filed on Nov. 27, 2013.

(51) Int. Cl.
  *H01M 2/06* (2006.01)
  *H01M 10/0525* (2010.01)

(52) U.S. Cl.
  CPC ....... *H01M 2/0262* (2013.01); *H01M 2/0275* (2013.01); *H01M 2/0277* (2013.01); *H01M 2/0285* (2013.01); *H01M 2/0287* (2013.01); *H01M 2/06* (2013.01); *H01M 10/0525* (2013.01); *H01M 2002/0297* (2013.01); *Y02T 10/7011* (2013.01)

(58) Field of Classification Search
  CPC ............. H01M 2/0275; H01M 2/0277; H01M 2/0285; H01M 2/0287; H01M 2/06
  See application file for complete search history.

(56) References Cited

U.S. PATENT DOCUMENTS

| | | | |
|---|---|---|---|
| 2003/0013012 A1 | 1/2003 | Ahn et al. | |
| 2004/0180260 A1* | 9/2004 | Somatomo | H01M 2/0426 429/174 |
| 2007/0128513 A1 | 6/2007 | Hatta et al. | |
| 2007/0264535 A1 | 11/2007 | Lee et al. | |
| 2008/0241680 A1 | 10/2008 | Lee et al. | |
| 2009/0311592 A1 | 12/2009 | You et al. | |
| 2010/0143787 A1 | 6/2010 | Jung et al. | |
| 2011/0086262 A1 | 4/2011 | Kim et al. | |
| 2011/0115437 A1* | 5/2011 | Kasai | H01M 2/1016 320/134 |
| 2011/0117425 A1 | 5/2011 | Kwak et al. | |
| 2011/0117426 A1* | 5/2011 | Choi | H01M 2/021 429/178 |
| 2011/0223461 A1* | 9/2011 | Kim | H01M 2/0262 429/120 |
| 2012/0040223 A1* | 2/2012 | Odumodu | H01M 2/1077 429/120 |
| 2012/0155001 A1 | 6/2012 | Fujikawa et al. | |
| 2012/0214051 A1 | 8/2012 | Tsukuda et al. | |
| 2012/0219847 A1 | 8/2012 | Hong et al. | |
| 2013/0071696 A1 | 3/2013 | Kim et al. | |
| 2013/0196215 A1* | 8/2013 | Karatsu | H01M 2/0287 429/176 |
| 2015/0093617 A1* | 4/2015 | Yoon | H01M 10/0525 429/94 |

FOREIGN PATENT DOCUMENTS

| | | |
|---|---|---|
| JP | 2002-110252 A | 4/2002 |
| JP | 2003-036821 A | 2/2003 |
| JP | 2003-092088 A | 3/2003 |
| JP | 2004-055151 A | 2/2004 |
| JP | 2008-243815 A | 10/2008 |
| JP | 2009-533834 A | 9/2009 |
| JP | 2010-509711 A | 3/2010 |
| JP | 2010-086744 A | 4/2010 |
| JP | 2011-216390 A | 10/2011 |
| JP | 2011-243522 A | 12/2011 |
| JP | 2012-174452 A | 9/2012 |
| JP | 2012-203983 A | 10/2012 |
| JP | 2012-226826 A | 11/2012 |
| KR | 10-2001-0082058 A | 8/2001 |
| KR | 10-2001-0082059 A | 8/2001 |
| KR | 10-2001-0082060 A | 8/2001 |
| KR | 10-2004-0054201 A | 6/2004 |
| KR | 20-0394701 Y1 | 9/2005 |
| KR | 10-2006-0053278 A | 5/2006 |
| KR | 10-2007-0099067 A | 10/2007 |
| KR | 10-2010-0032064 A | 3/2010 |
| KR | 10-2011-0055254 A | 5/2011 |
| KR | 10-2012-0056316 A | 6/2012 |
| KR | 10-2012-0097312 A | 9/2012 |
| WO | 2006/043760 A1 | 4/2006 |
| WO | 2006/135183 A1 | 12/2006 |

OTHER PUBLICATIONS

Extended European Search Report, dated Jul. 21, 2015, for EP Application No. 13836250.4.

European Search Report dated Aug. 31, 2016, for Application No. 13836250.4.

* cited by examiner

METHOD FOR FORMING A POUCH FOR A SECONDARY BATTERY

This application is a continuation of U.S. application Ser. No. 14/224,357 filed on Mar. 25, 2014, which is a continuation of PCT International Application No. PCT/KR2013/010845 filed on Nov. 27, 2013, which are hereby expressly incorporated by reference into the present application.

TECHNICAL FIELD

The present invention relates to a structure of a pouch which may be used in a high-capacity battery having high capacity and high stiffness.

BACKGROUND ART

Recently, lithium secondary batteries, which are chargeable/dischargeable and lightweight and have high energy density and high output density, have been widely used as energy sources for wireless mobile devices. Lithium secondary batteries have also attracted considerable attention as power sources for hybrid electric vehicles (HEVs), plug-in hybrid electric vehicles (PHEVs), battery electric vehicles (BEVs), and electric vehicles (EVs), which have been developed to solve limitations such as air pollution and green-house gases that are caused by existing internal combustion engine vehicles that use fossil fuels such as gasoline and diesel vehicles.

Lithium secondary batteries are classified by electrode type into lithium ion batteries that use liquid electrolyte and lithium polymer batteries that use polymer electrolyte. Further, lithium secondary batteries are classified into cylindrical-type, prismatic-type, or pouch-type lithium secondary batteries according to the shape of their casing in which an electrode assembly is accommodated.

Among these, the pouch-type lithium secondary battery has a pouch exterior including a metallic layer (foil) and a multi-layered synthetic resin film which are applied to top and bottom surfaces of the metallic layer. Thus, the pouch-type lithium secondary battery may be developed as a lightweight lithium secondary battery and changed into various shapes because it is possible to significantly reduce the weight of the battery in comparison with the cylindrical-type or prismatic-type secondary lithium secondary battery which utilizes a metallic can.

The pouch exterior includes upper and lower exteriors which are formed by folding a middle portion of one side of a rectangular casing in a longitudinal direction. Here, press processing may be performed on the lower exterior to form a space part for accommodating an electrode assembly. Various electrode assembles having a structure, in which a cathode, a separator, and an anode that have mainly plate shapes are stacked, are accommodated in the space part of the lower exterior. Then, an electrolyte is injected, and edges around the space part of the lower exterior are closely attached to edges of the upper exterior corresponding to the lower exterior. Thereafter, the closely attached portions are thermally welded to form the sealed pouch-type secondary battery.

FIG. 1 is a schematic exploded perspective view illustrating a general structure of a representative pouch-type secondary battery according to a related art.

Referring to FIG. 1, a pouch-type secondary battery 1 includes an electrode assembly 10, electrode tabs 31 and 32 extending from the electrode assembly 10, electrode leads 51 and 52 welded to the electrode tabs 31 and 32, and a battery case 20 accommodating the electrode assembly 10.

The electrode assembly 10 may be a power generation device in which a cathode and an anode are successively stacked with a separator therebetween. The electrode assembly 10 has a stacked or stacked/folded type structure. The electrode tabs 31 and 32 extend from electrode plates of the electrode assembly 10, respectively. The electrode leads and 52 are electrically connected to the plurality of electrode tabs 31 and 32 respectively extending from the electrode plates through welding, respectively. Here, a portion of each of the electrode leads 51 and 52 is exposed to the outside of the battery case 20. Also, an insulation film 53 may be attached to a portion of each of top and bottom surfaces of the electrode leads 51 and 52 to enhance sealability and secure electrical insulation with respect to the battery case 20.

Also, the plurality of cathode and anode tabs 31 and 32 are integrally coupled to form welded portions, respectively. Thus, an inner, upper end of the battery case 20 is spaced a predetermined distance from a top surface of the electrode assembly 10, and each of the tabs 31 and 32 of the welded portions is bent in an approximately V shape (hereinafter, coupled portions of the electrode tabs and the electrode leads are called V-forming portions 41 and 42). The battery case 20 is formed with an aluminum laminate sheet and provides a space for accommodating the electrode assembly 10. Also, the battery case 20 has an overall pouch shape. After the electrode assembly 10 is built in an accommodation part of the battery case 20, and then an electrolyte (not shown) is injected, outer circumferential surfaces at which an upper laminate sheet and a lower laminate sheet of the battery case 20 contact each other are thermally welded to manufacture the secondary battery.

With respect to secondary batteries, there is a growing demand for medium- and large-sized batteries for vehicles and energy storage, and the medium- and large-sized batteries tend to be continuously thicker as large and high-energy cells are developed. Also, since the number of parallel connections of the battery must be reduced to obtain a cost reduction effect (in terms of module, pack assembly, and cell price), an increase in the capacity of cells tends to be accelerated.

However, with respect to a typical large-sized polymer battery, since the number of cell stacks constituting an electrode assembly may be high, an overall thickness may increase, and only a battery having a predetermined thickness (5 mm) or less may be prepared due to the forming limit of a pouch.

DISCLOSURE OF THE INVENTION

Technical Problem

The present invention provides a configuration of a pouch that may accommodate a high-capacity polymer battery, wherein the configuration of the pouch is embodied to be suitable for storing a high-capacity battery having a large number of stacks by forming an upper portion of the pouch as an upper housing module having a structure, in which a polymer film layer is disposed on a base plate formed of aluminum (Al), and providing a structure in which films formed of Al are fused together, i.e., a typical pouch, to a lower portion of the pouch.

Technical Solution

According to an aspect of the present invention, there is provided a pouch for a secondary battery including an upper housing module which includes a metallic base plate having a concave-shaped accommodation space, and a polymer layer formed on one surface or both surfaces of the base plate; and a lower pouch sheet which is combined with a lower surface of the upper housing module to seal the accommodation space.

The polymer layer may be a reinforcing layer formed of any one selected from the group consisting of cast polypropylene (CPP), polyethylene (PE), polypropylene (PP), urethane, polyethylene terephthalate (PET), polyimide (PI), Nylon, and a combination thereof, or a mixture of two or more thereof.

The reinforcing layer may include a first reinforcing layer which is formed of a material selected from the group consisting of CPP, urethane, PET, PI, Nylon, and a combination thereof on an outer surface of the base plate, that is the opposite side of the accommodation space with respect to the accommodation space of the base plate; and a second reinforcing layer which is formed in a structure in which one or more layers of a material selected from the group consisting of PE, PP, and a combination thereof are stacked on an inner surface of the base plate facing the accommodation space.

The second reinforcing layer formed on the inner surface of the base plate may be formed of at least two or more layers. When the second reinforcing layer is formed of two layers, the second reinforcing layer is composed of a first material layer that is in contact with the inner surface of the base plate, and a second material layer formed on the first material layer, wherein the first material layer is formed of a material having a higher melting point than the second material layer.

In this case, the first material layer may be formed of a material having a 20° C. to 30° C. higher melting point than the second material layer.

The lower pouch sheet having a structure of sealing the accommodation space may be formed of a material selected from the group consisting of an alloy of iron (Fe), carbon (C), chromium (Cr), and manganese (Mn), an alloy of Fe, C, Cr, and nickel (Ni), aluminum (Al), copper (Cu), an equivalent thereof, and a combination thereof.

The upper housing module may further include integrated lead tabs in which tabs, which are respectively connected to electrodes of an electrode assembly that is accommodated in the accommodation space, are formed as an integrated structure, a pair of the integrated lead tabs may be formed on one side of the upper housing module, and each of a pair of the integrated lead tabs may be formed on both one side and another side of the upper housing module.

The base plate may have a thickness in a range of 0.12 mm to 0.3 mm, and the base plate may be formed of any one selected from the group consisting of Al, Fe, steel use stainless (SUS), high density plastic, and a combination thereof.

The polymer layers stacked on the base plate may have a total thickness in a range of 80 μm to 200 μm, and the upper housing module may have a total thickness in a range of 0.2 mm to 0.5 mm.

Also, the lower pouch sheet may have a thickness in a range of 150 μm to 180 μm.

According to another aspect of the present invention, there is provided a secondary battery formed by including an electrode assembly in the above-described pouch.

The electrode assembly may be formed in a structure selected from the group consisting of a wound type structure, a stacked type structure, and a stacked/folded type structure.

Advantageous Effects

Since a configuration of a pouch accommodating a high-capacity polymer battery may be provided as in the present invention, the configuration of the pouch may be embodied to be suitable for storing a high-capacity battery having a large number of stacks.

MODE FOR CARRYING OUT THE INVENTION

Figure 1:
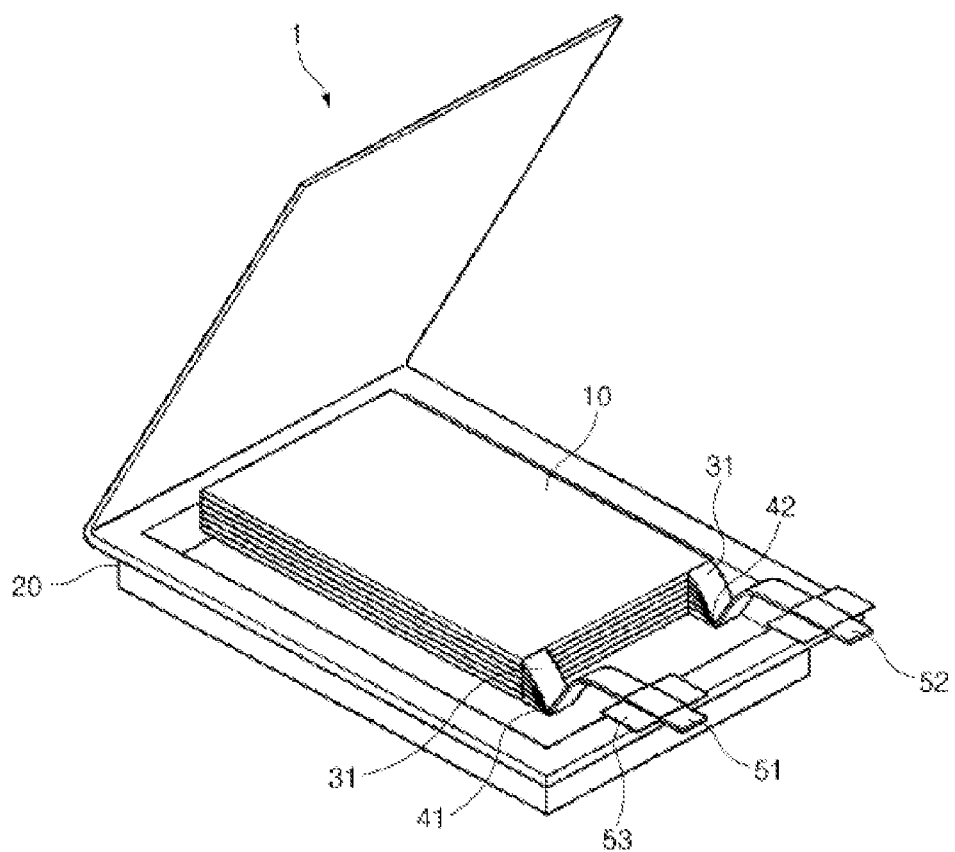
FIG. 1 is a conceptual view illustrating a structure of a typical secondary battery.

Exemplary embodiments of the present invention will now be described in detail with reference to the accompanying drawings. In the description with reference to the attached drawings, like reference numerals in the drawings denote like elements, and thus repetitive descriptions thereof will not be provided. Though terms like "first" and "second" are used to describe various components, the components are not limited to these terms. These terms are used only to differentiate one component from another.

Figure 2:
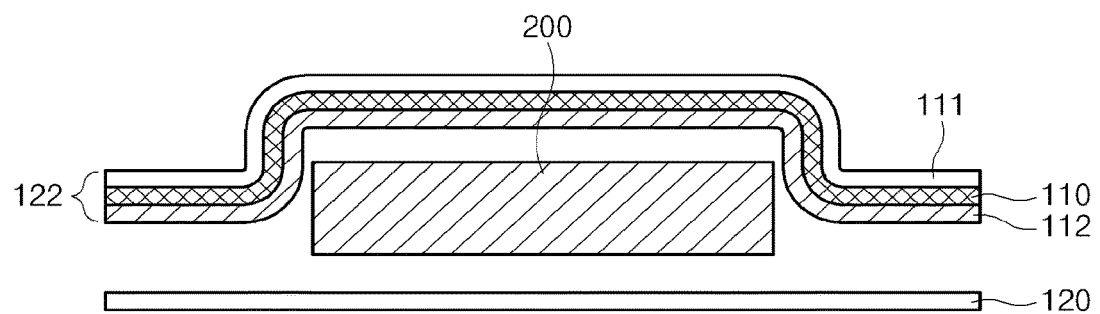
FIGS. 2 and 3 are sectional conceptual views illustrating a structure of a pouch constituting a secondary battery according to the present invention and a stack structure of a reinforcing layer in an upper housing module.

FIG. 2 is a sectional conceptual view illustrating a structure of a pouch for a secondary battery according to the present invention.

Referring to FIG. 2, the pouch for a secondary battery according to the present invention may include an accommodation space of an electrode assembly, and may be formed by including an upper housing module 122, in which polymer layers 111 and 112 are formed on one surface or both surfaces of a base plate 110, and a lower pouch sheet 120 which is combined with a lower surface of the upper housing module 122 to seal the accommodation space.

In particular, the upper housing module 122 has a can-type structure, in which the accommodation space of the electrode assembly is formed by molding the metallic base plate 110 having a thickness of 0.12 mm to 0.3 mm, and may be realized in a structure, in which a reinforcing layer formed of any one selected from the group consisting of cast polypropylene (CPP), polyethylene (PE), polypropylene (PP), urethane, polyethylene terephthalate (PET), polyimide (PI), and Nylon, or a mixture of two or more thereof is disposed on a surface of the base plate 110. In addition, a total thickness of the base plate and the reinforcing layer may be in a range of 0.2 mm to 0.5 mm, and in this case, the base plate 110 may be formed of any one of aluminum (Al), iron (Fe), steel use stainless (SUS), and high density plastic.

In particular, the reinforcing layer may be composed of a first reinforcing layer 111 which is formed of any one material of CPP, urethane, PET, PI, and Nylon on an opposite side of the accommodation space based on the accommodation space of the base plate 110, i.e., an outer surface of the base plate 110, and a second reinforcing layer 112 which is formed in a structure in which one or more layers of any one material of PE and PP are stacked on an inner surface of the base plate 110 facing the accommodation space. The second reinforcing layer 112 may be formed in a multilayer structure having at least two or more layers.

Figure 3:
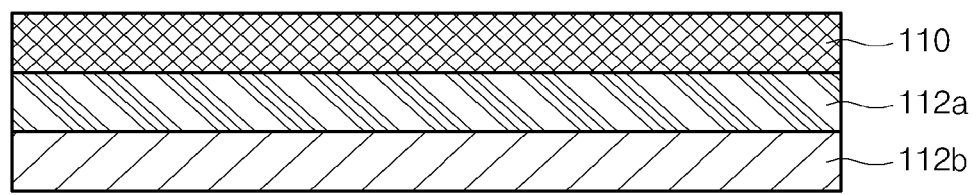

Also, in a case where the second reinforcing layer 112 is formed in the multilayer structure, the second reinforcing layer 112, as illustrated in FIG. 3, may be composed of a first material layer 112a that is in contact with the inner surface of the base plate 110, and a second material layer 112b formed on the first material layer 112a, wherein the first material layer 112a may be formed of a material having a relatively higher melting point than the second material layer 112b. In particular, the first material layer 112a may be formed of a material having a 20° C. to 30° C. higher melting point than the second material layer 112b. In this case, in a hot-pressing process of the lower pouch sheet 120 according to the present invention, the layer having a relatively lower melting point may not only be first melted to increase sealability, but the first material layer 112a may also not be melted, and thus, a direct contact between metal layers (upper housing module and lower pouch sheet) may not occur. That is, insulation properties may be improved by preventing the contact between the metal layers. A total thickness of the polymer layers stacked on the base plate 110 may be in a range of 80 μm to 200 μm.

The lower pouch sheet having a structure of sealing the accommodation space may be formed of any one material selected from the group consisting of an alloy of Fe, carbon (C), chromium (Cr), and manganese (Mn), an alloy of Fe, C, Cr, and nickel (Ni), Al, copper (Cu), or an equivalent thereof, and may be generally formed of Al. Also, the lower pouch sheet may have a thickness in a range of 150 μm to 180 μm.

In the upper housing module and the lower pouch sheet, the terms "upper" and "lower", as a relative concept, are used only for convenience of explanation, and it should not be understood to mean that the housing module including the accommodation space and polymer layer is necessarily disposed on the pouch sheet.

Figure 4:
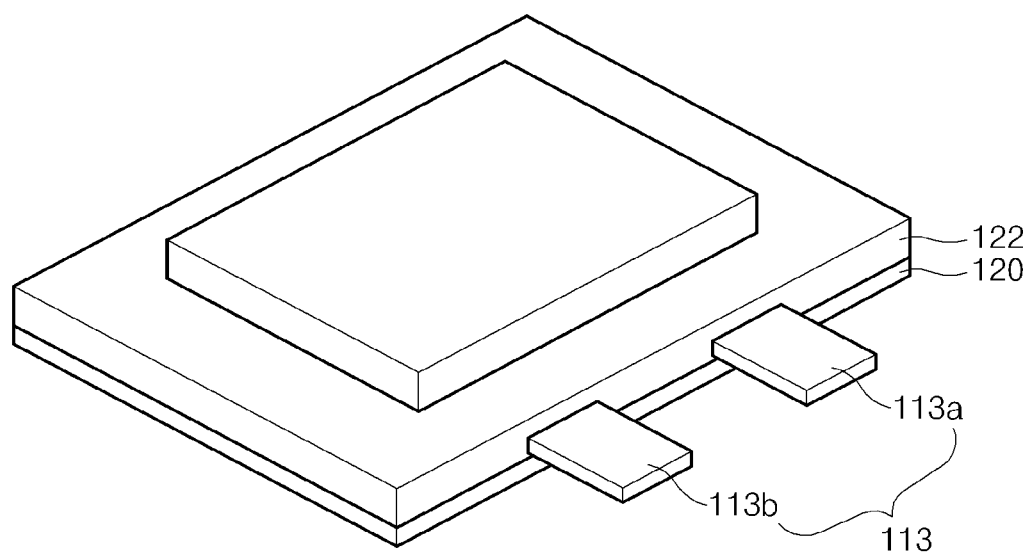
FIGS. 4 and 5 are combined perspective views illustrating the secondary battery according to the present invention.
Figure 5:
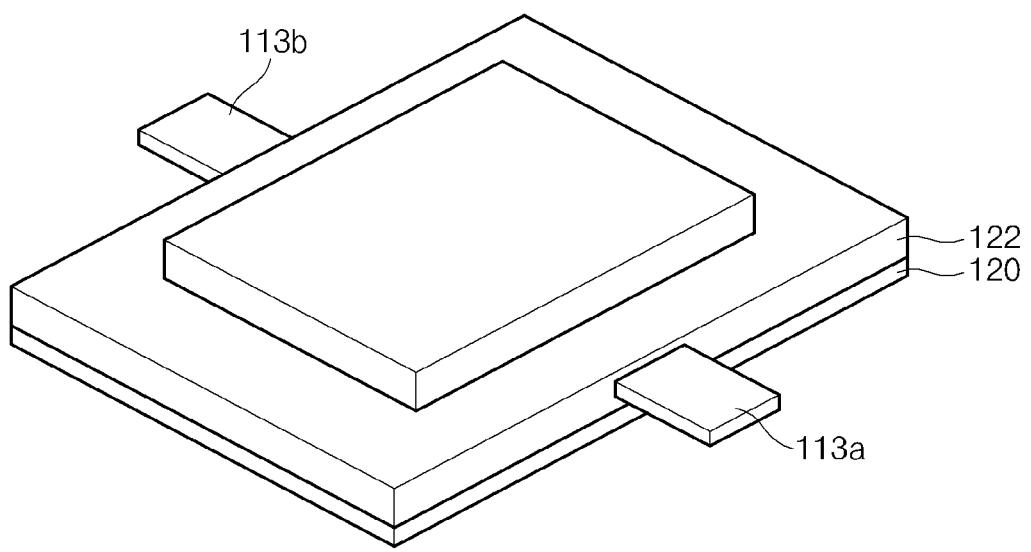

FIGS. 4 and 5 illustrate secondary batteries having a structure in which an electrode assembly is inserted in a pouch sheet according to the present invention.

As described in FIGS. 2 and 3, the pouch according to the present invention may be formed in a structure in which an accommodating part capable of accommodating an electrode assembly is formed by molding a metallic base plate, the metallic base plate is coated with a reinforcing material, and the coated base plate is then thermally fused to a lower pouch sheet.

As illustrated in FIGS. 4 and 5, an upper housing module 122 of the pouch sheet according to the present invention may include integrated lead tabs 113a and 113b in which tabs, which are respectively connected to electrodes of the electrode assembly that is accommodated in the accommodation space, are formed as an integrated structure. The integrated lead tabs 113a and 113b may be formed in a bidirectional lead tab structure as illustrated in FIG. 5 as well as a unidirectional lead tab structure as illustrated in FIG. 4. The integrated lead tabs may be integrally formed in the upper housing module while forming a can-type structure (solidified upper housing module), and in a case where the electrode assembly is installed therein in a subsequent assembly process, this may simplify an assembly operation in the process by directly connecting the electrode assembly to the tabs in an insertion process without a separate welding process.

Various electrode assemblies may be inserted in the above-described pouch according to the present invention. The electrode assembly used in the present invention may be classified as a jelly-roll (wound) type electrode assembly having a structure, in which long-sheet type cathodes and anodes are wound while separators are respectively disposed therebetween, and a stacked (laminated) type electrode assembly in which pluralities of cathodes and anodes having a predetermined size are sequentially stacked while separators are respectively disposed therebetween. For example, the electrode assembly may have a stacked type structure and a stacked/folded structure. Since the stacked type structure is well known in the art, the description thereof is omitted in the present specification. The details of the stacked/folded type electrode assembly are disclosed in Korean Patent Application Laid-Open Publication Nos. 2001-0082058, 2001-0082059, and 2001-0082060 of the present applicants, and the above publications are incorporated by reference into the content of the present invention.

Hereinafter, specific materials and structural features of components constituting the electrode assembly that is inserted into the above-described pouch according to the present invention will be described.

Hereinafter, specific materials and structural features of components constituting the electrode assembly that is used in the above-described embodiment according to the present invention will be described.

Cathode Structure

The unit electrode in the present invention is classified into a cathode and an anode. The cathode and the anode are mutually coupled to each other with a separator therebetween to manufacture the full cell and bi-cell. For example, the cathode may be manufactured by applying a mixture of a cathode active material, a conductive material, and a binder on a cathode collector and then performing drying and pressing processes on the cathode collector on which the mixture is applied. As necessary, a filler may be added to the mixture.

[Cathode Collector]

Generally, the cathode collector is fabricated to have a thickness of about 3 μm to about 500 μm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

[Cathode Active Material]

In case of the lithium secondary battery, the cathode active material may include a layered compound such as lithium cobalt oxide ($LiCoO_2$) and lithium nickel oxide ($LiNiO_2$), or a compound substituted with at least one transition metal; a lithium manganese oxide such as the chemical formula $Li_{1+x}Mn_{2-x}O_4$ (where x ranges from about 0 to about 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; nickel (Ni)-site type lithium nickel oxide expressed by the chemical formula $LiNi_{1-x}M_xO_2$ (where M=Co, Mn, Al, Cu, Fe, Mg, B, or Ga, and x ranges from about 0.01 to about 0.3); lithium manganese complex oxide expressed by the chemical formula $LiMn_{2-x}M_xO_2$ (where M=Co, Ni, Fe, Cr, Zn, or Ta, and x ranges from about 0.01 to about 0.1) or $Li_2Mn_3MO_8$ (where M=Fe, Co, Ni, Cu, or Zn); $LiMn_2O_4$, with a part of lithium of a chemical formula being substituted with alkaline earth metal ions; a disulfide compound; or a complex oxide formed of $Fe_2(MoO_4)_3$, but the present invention is not limited thereto.

The conductive material is commonly added in an amount of about 1 to about 50% by weight on the basis of the total weight of the mixture including the cathode active material. Any conductive material may be used without particular limitation so long as it has suitable conductivity without causing adverse chemical changes in the batteries. For example, the conductive material may include conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder is a component that assists in the binding between the active material and conductive material and in the binding with the collector. The binder is commonly added in an amount of about 1 to about 50% by weight on the basis of the total weight of the compound including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene butadiene rubber, a fluoro rubber, various copolymers, and the like.

The filler is a component selectively used to inhibit expansion of the anode. There is no particular limit to the filler, so long as it does not cause adverse chemical changes in the batteries and is a fibrous material. Examples of the filler may include olefin-based polymers such as polyethylene and polypropylene; and fibrous materials such as glass fibers and carbon fibers.

Anode Structure

The anode is formed by applying, drying, and pressing an anode active material on an anode collector. As necessary, the conductive material, the binder, and the filler may be further selectively added to the anode.

[Anode Collector]

The anode collector is generally fabricated to have a thickness of about 3 µm to about 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

[Anode Active Material]

For example, the anode active material may include: carbon such as hard carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, or Ge; Me': Al, B, P, Si, Groups I, II and III elements, or halogen; $0 < x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material.

[Separator]

Since the full cells are disposed on a long separator sheet and the separator sheet is then wound in a structure in which the separator sheet is included in an overlapping portion, each full cell may be stacked to make the cathode and the anode to face each other in a state in which a separator film is disposed therebetween. The separator sheet may have a length extending to wrap around the electrode assembly once after the winding, and outermost ends of the separator sheet may be fixed by heat fusion or taping. For example, the separator sheet itself is made to be fused by heat, bonded, and fixed by contacting the finished separator sheet with a thermal welder or a heat plate. Thus, a pressure may be continuously maintained to enable the electrodes to stably surface-contact the separator sheet.

The separator sheet or the separator interposed between the cathode and anode of a cell are not particularly limited in terms of material if the separator sheet or the separator has a porous structure in which ions are capable of moving. The separator and the separator sheet may or may not be formed of the same material.

As the separator or the separator sheet—for example, an insulating thin film having high ion permeability and mechanical strength—may be used. The separator or the separator sheet typically has a pore diameter of about 0.01 µm to about 10 µm and a thickness of about 5 µm to about 300 µm. For example, sheets or non-woven fabrics made of an olefin-based polymer such as polypropylene, glass fibers or polyethylene, which have chemical resistance and hydrophobicity, are used as the separator or the separator sheet. When a solid electrolyte such as a polymer is employed as the electrolyte, the solid electrolyte may also serve as the separator. The separator may be a polyethylene film, a polypropylene film, a multi-layered film made from combinations of these films, or a polymer film for a polymer electrolyte or gel-type polymer electrolyte such as polyvinylidene fluoride, polyethylene oxide, polyacrylonitrile, or a polyvinylidene fluoride hexafluoropropylene copolymer.

The separator may have an adhesion function through thermal bonding to constitute the full cell or bi-cell. The separator sheet may also (but not necessarily) have the adhesion function in order to facilitate a winding process.

Also, the present invention exemplifies a structure, in which an electrode is disposed on a single separator and the separator is wound in one direction or a zigzag direction in order to form the full cell or bi-cell. However, the present invention is not limited thereto. A structure, which is laminated by respectively disposing additional separators between a plurality of electrodes, may also be used.

The secondary battery according to the present invention may not only be used in a medium- and large-sized battery module including the secondary battery as a unit cell, but may also be used as a power source of one or more medium- and large-sized devices selected from the group consisting of a power tool; an electric vehicle (EV) selected from the group consisting of an electric car, a hybrid electric vehicle (HEV), and a plug-in hybrid electric vehicle (PHEV); an E-bike; an E-scooter; an electric golf cart; an electric truck; and an electric commercial vehicle, when the secondary batteries are used in a battery pack including battery modules.

The medium- and large-sized battery module may be configured to provide high-output and large-capacity by connecting the plurality of unit cells to each other in series or in serial-parallel connection. However, since this structure is well-known in the art, a detailed description thereof will not be provided.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method for forming a pouch for a secondary battery, the method comprising:
   forming an upper housing module with a base plate, the upper housing module having a concave-shaped accommodation space;
   depositing a first reinforcing layer on an upper surface of the base plate;
   depositing a second reinforcing layer on a lower surface of the base plate, the second reinforcing layer facing the accommodation space; and
   depositing the upper housing module on a lower pouch sheet made of metal to seal the accommodation space, wherein at least a portion of a metal surface of the lower pouch sheet is bonded directly to at least a portion of a non-metal outer surface of the second reinforcing layer.

2. The method of claim 1, wherein the second reinforcing layer comprises at least two or more layers.

3. The method of claim 2, wherein the second reinforcing layer comprises a first material layer that contacts the lower surface of the base plate, and a second material layer formed on the first material layer.

4. The method of claim 3, wherein the first material layer is formed of a material having a higher melting point than the second material layer.

5. The method of claim 4, wherein the first material layer is formed of a material having a 20° C. to 30° C. higher melting point than the second material layer.

6. The method of claim 1, wherein the lower pouch sheet is formed of a material selected from the group consisting of an alloy of iron (Fe), carbon (C), chromium (Cr), and manganese (Mn), an alloy of Fe, C, Cr, and nickel (Ni), aluminum (Al), copper (Cu), an equivalent thereof, and a combination thereof.

7. The method of claim 1, further comprising:
   forming integrated lead tabs integrally in the upper housing module, wherein the integrated tabs are embedded in the upper housing module.

8. The method of claim 7, further comprising:
   placing an electrode assembly to be accommodated in the accommodation space, before the depositing the upper housing module on the lower pouch sheet, wherein the integrated lead tabs are respectively connected to electrodes of the electrode assembly.

9. The method of claim 7, wherein the integrated lead tabs are formed on a same side of the upper housing module.

10. The method of claim 7, wherein the integrated lead tabs are formed on different sides of the upper housing module.

11. The method of claim 1, wherein the base plate is formed of a material selected from the group consisting of Al, Fe, steel use stainless (SUS), high density plastic, and a combination thereof.

12. The method of claim 1, wherein a total thickness of the first reinforcing layer and the second reinforcing layer is in a range of 80 μm to 200 μm.

13. The method of claim 1, wherein a structure of the electrode assembly is a wound type structure, a stacked type structure, or a stacked/folded type structure.

14. The method of claim 7, wherein the integrated lead tabs are integrally formed in the upper housing module to form a can-type structure thereby making the upper housing module sealed.

15. The method of claim 1, the electrode assembly is classified as a jelly-roll type electrode assembly in which a plurality of long-sheet type cathodes and anodes are wound while separators are respectively disposed therebetween, or a stacked type electrode assembly in which a plurality of cathodes and anodes having a predetermined size are sequentially stacked while separators are respectively disposed therebetween.

16. The method of claim 1, wherein the forming of the upper housing module and the forming of the integrated tab leads are done in one step.

17. The method of claim 1, wherein the second reinforcing layer comprises one or more layers formed of a material selected from a group consisting of polyethylene (PE), polypropylene (PP), and a combination thereof.

18. The method of claim 1, wherein the first reinforcing layer is formed of a material selected from a group consisting of cast polypropylene (CPP), urethane, polyethylene terephthalate (PET), polyimide (PI), Nylon, and a combination thereof.

19. The method of claim 1, wherein the lower pouch sheet has a thickness in a range of 150 μm to 180 μm.

20. The method of claim 1, wherein the base plate has a thickness in a range of 0.12 mm to 0.3 mm.

21. The method of claim 1, wherein the upper housing module has a thickness in a range of 0.2 mm to 0.5 mm.

* * * * *